United States Patent
Lee et al.

(10) Patent No.: US 11,175,971 B1
(45) Date of Patent: Nov. 16, 2021

(54) METHOD FOR SERVING CLOUD OF QUANTUM COMPUTING AND COMPUTING DEVICE FOR EXECUTING THE METHOD

(71) Applicant: SAMSUNG SDS CO., LTD., Seoul (KR)

(72) Inventors: Jae Young Lee, Seoul (KR); Ji Won Jung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/883,417

(22) Filed: May 26, 2020

(30) Foreign Application Priority Data

May 14, 2020 (KR) .................. 10-2020-0057909

(51) Int. Cl.
*G06N 10/00* (2019.01)
*G06F 3/00* (2006.01)
*G06F 9/54* (2006.01)

(52) U.S. Cl.
CPC ............ *G06F 9/547* (2013.01); *G06N 10/00* (2019.01)

(58) Field of Classification Search
CPC ............ G06F 9/54; G06G 9/54; G06N 10/00
USPC ....................................................... 719/328
See application file for complete search history.

(56) References Cited

U.S. PATENT DOCUMENTS

| | | | | |
|---|---|---|---|---|
| 8,601,499 B2* | 12/2013 | Tofighbakhsh | ....... | H04L 45/306 719/328 |
| 2008/0235713 A1* | 9/2008 | Beverly | .................. | G06F 9/547 719/328 |
| 2020/0293388 A1* | 9/2020 | Cyr | .......................... | H04L 67/42 |

OTHER PUBLICATIONS

Jeffrey C. Mogul, API Design Challenges for Open Router Platforms on Proprietary Hardware. (Year: 2008).*
Christopher Havenstein, Comparisons of Performance between Quantum and Classical Machine Learning. (Year: 2018).*

* cited by examiner

*Primary Examiner* — Lechi Truong
(74) *Attorney, Agent, or Firm* — The PL Law Group, PLLC

(57) ABSTRACT

A method for serving cloud of quantum computing according to an embodiment may include receiving a request to perform quantum computing from a client and providing a standard resource description to the client, receiving, from the client, resource-related information corresponding to the standard resource description, providing a standard application program interface (API) to the client, and receiving, from the client, standard quantum computing code created through the standard API, selecting quantum computing hardware, which is to execute the standard quantum computing code, among a plurality of quantum computing hardware, based on one or more among the resource-related information and the standard quantum computing code, converting the standard quantum computing code into quantum computing code executable on the selected quantum computing hardware, and executing the converted quantum computing code using the selected quantum computing hardware.

16 Claims, 4 Drawing Sheets

100

METHOD FOR SERVING CLOUD OF QUANTUM COMPUTING AND COMPUTING DEVICE FOR EXECUTING THE METHOD

CROSS REFERENCE TO RELATED APPLICATIONS AND CLAIM OF PRIORITY

This application claims the benefit of Korean Patent Application No. 10-2020-0057909 filed on May 14, 2020 in the Korean Intellectual Property Office, the disclosure of which is incorporated herein by reference in its entirety.

TECHNICAL FIELD

Embodiments disclosed herein relate to a technology that serves cloud-based quantum computing.

BACKGROUND ART OF THE INVENTION

Quantum computing refers to a method of processing data, utilizing quantum mechanical phenomena such as quantum entanglement or superposition. In order to utilize quantum computing, it is necessary to understand various technical concepts related to the implementation principle of a quantum computer, and to grasp and reflect a degree of technology implementation of specific hardware in actual development of algorithm or the like. This requires significant technical expertise and degrades availability for various hardware, which results in a barrier in terms of accessibility, dissemination, marketability, and availability of quantum computing.

Accordingly, there is a need for a method by which users who are not professional in quantum computing may easily access and use various non-standardized quantum computing hardware and application program interfaces (APIs).

SUMMARY

Embodiments disclosed herein are intended to provide a method for serving cloud of quantum computing and a computing device for executing the method, which allow general users to easily access and utilize a cloud quantum computing service.

A method for serving cloud of quantum computing according to the disclosed embodiment that is performed in a computing device including one or more processors and a memory storing one or more programs executed by the one or more processors, the method including receiving, from a client, a request to perform quantum computing, and providing a standard resource description to the client, receiving, from the client, resource-related information corresponding to the standard resource description, providing a standard application program interface (API) to the client and receiving standard quantum computing code created through the standard API from the client, selecting quantum computing hardware, which is to execute the standard quantum computing code, among a plurality of quantum computing hardware, based on one or more among the resource-related information and the standard quantum computing code, converting the standard quantum computing code into quantum computing code executable on the selected quantum computing hardware, and executing the converted quantum computing code using the selected quantum computing hardware.

The resource-related information may include resource items required for quantum computing and a resource scale for each resource item, and the resource items may include one or more among the number of qubits, qubit lifetime, gate fidelity, gate operation time, and qubit connectivity.

The method for serving cloud of quantum computing may further include interpreting the standard quantum computing code and reconstructing the standard quantum computing code according to a result of the code interpretation.

The reconstructing of the standard quantum computing code may include checking whether or not a maximum number of qubits according to the standard quantum computing code exceeds the preset threshold number of qubits and reconstructing the standard quantum computing code in order that the maximum number of qubits according to the standard quantum computing code is equal to or less than the preset threshold number of qubits when the maximum number of qubits exceeds the preset threshold number of qubits. The reconstructing of the standard quantum computing code may include checking whether or not a number of quantum gates simultaneously operated in the standard quantum computing code exceeds preset threshold number of operators and reconstructing the standard quantum computing code in order that the number of quantum gates simultaneously operated in the standard quantum computing code is equal to or less than the preset threshold number of operators when the number of the quantum gates exceeds the preset threshold number of operators.

The reconstructing of the standard quantum computing code may include one or more among shortening execution time of the standard quantum computing code, removing unnecessary or redundant operations included in the standard quantum computing code, and reducing resources used for execution of the standard quantum computing code.

The resource-related information may include resource items required for quantum computing and a resource scale for each resource item, and the selecting of the quantum computing hardware may include assigning a matching score according to a degree of similarity between the resource scale of each resource item of the resource-related information and a specification of each of the plurality of quantum computing hardware, and selecting, as quantum computing hardware which is to execute the corresponding standard quantum computing code, the quantum computing hardware with a highest total matching score for each resource item among the plurality of quantum computing hardware.

The converting of the quantum computing code may convert the standard quantum computing code into a quantum computing code by an application program interface (API) of the selected quantum computing hardware.

The method for serving cloud of quantum computing may further include, after executing the converted quantum computing code using the selected quantum computing hardware, transferring a result of executing the converted quantum computing code using the selected quantum computing hardware to the client through the standard API.

A computing device according to the disclosed embodiment configured to include one or more processors, a memory, and one or more programs stored in the memory and executed by the one or more processors, the computing device including a standard resource description provision module that receives a request to perform quantum computing from a client, provides a standard resource description to the client, and receives, from the client, resource-related information corresponding to the standard resource description, a standard API provision module that provides a standard application program interface (API) to the client and receives, from the client, standard quantum computing code created through the standard API, a hardware selection module that selects quantum computing hardware, which is to execute the standard quantum computing code, among a plurality of quantum computing hardware, based on one or more among the resource-related information and the standard quantum computing code, and a code execution module that converts the standard quantum computing code into quantum computing code executable on the selected quantum computing hardware, and executes the converted quantum computing code using the selected quantum computing hardware.

The resource-related information may include resource items required for quantum computing and a resource scale for each resource item, and the resource items may include one of more among number of qubits, qubit lifetime, gate fidelity, gate operation time, and qubit connectivity.

The computing device may further include a code optimization module that interprets the standard quantum computing code and reconstructs the standard quantum computing code according to a result of the code interpretation.

The code optimization module may check whether or not a maximum number of qubits according to the standard quantum computing code exceeds the preset number of threshold qubits and reconstruct the standard quantum computing code in order that the maximum number of qubits according to the standard quantum computing code is equal to or less than the preset threshold number of qubits when the maximum number of qubits exceeds the preset threshold number of qubits.

The code optimization module may check whether or not a number of quantum gates simultaneously operated in the standard quantum computing code exceeds the preset threshold number of operators, and reconstruct the standard quantum computing code in order that the number of quantum gates simultaneously operated in the standard quantum computing code is equal to or less than the preset threshold number of operators when the number of the quantum gates exceeds the preset threshold number of operators.

The code optimization module may perform one or more among shortening execution time of the standard quantum computing code, removing unnecessary or redundant operations included in the standard quantum computing code, and reducing resources used for execution of the standard quantum computing code.

The resource-related information may include resource items required for quantum computing and a resource scale for each resource item, and the hardware selection module may assign a matching score according to a degree of similarity between the resource scale of each resource item of the resource-related information and a specification of each of the plurality of quantum computing hardware, and select, as quantum computing hardware which is to execute the corresponding standard quantum computing code, the quantum computing hardware with a highest total matching score for each resource item among the plurality of quantum computing hardware.

The code execution module may convert the standard quantum computing code into a quantum computing code by an application program interface (API) of the selected quantum computing hardware.

The code execution module may transfer a result of executing the converted quantum computing code using the selected quantum computing hardware to the client through the standard API.

According to the disclosed embodiments, a standard resource description and an standard API are provided to a client, resource-related information and standard quantum computing code are received from the client, quantum computing hardware executable in an optimal environment is selected, and the standard quantum computing code is converted into quantum computing code executable on the quantum computing hardware and executed, thereby allowing a user to easily utilize a quantum computing environment including various quantum computing hardware and APIs. As a result, it is possible to meet a paradigm shift from classical computing to quantum computing, and to improve accessibility and marketability of quantum computing.

DETAILED DESCRIPTION

Figure 1:
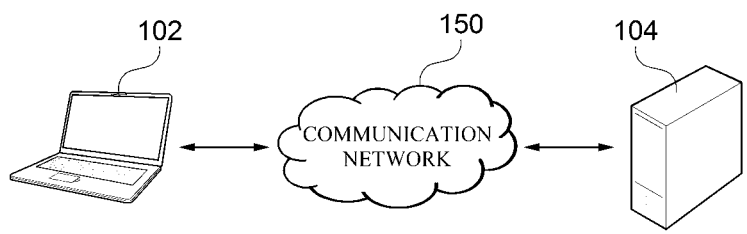
FIG. 1 is a diagram illustrating a configuration of a quantum computing cloud service system according to an embodiment of the present invention.

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless expressly used otherwise, a singular form includes a plural form. In this description, expressions such as "including" or "comprising" are intended to indicate any property, number, step, element, and some or combinations thereof, and such expressions should not be interpreted to exclude the presence or possibility of one or more other properties, numbers, steps, elements other than those described, and some or combinations thereof.

In the following description, terms such as "transmission", "communication", "sending", "reception" of a signal or information, or other terms having similar meanings to these terms include not only a meaning that a signal or information is directly sent from one component to another component, but also a meaning that a signal or information is sent via another component. In particular, "transmitting" or "sending" a signal or information to one component indicates that the signal or information is "transmitted" or "sent" to the final destination of the signal or information, and does not mean that the component is a direct destination of the signal or information. The same is true for the "reception" of a signal or information. Also, in this specification, the fact that two or more pieces of data or information are "related" to each other means that when one piece of data (or information) may be acquired, at least a part of pieces of other data (or information) may be acquired based on the acquired data (information).

Further, terms such as first and second may be used to describe various components, but the components should not be limited by the terms. The terms may be used for the purpose of distinguishing one component from other components. For example, a first component may be referred to as a second component without departing from the scope of the present invention, and similarly, the second component may also be referred to as the first component.

FIG. 1 is a diagram illustrating a configuration of a quantum computing cloud service system according to an embodiment of the present invention.

Referring to FIG. 1, a quantum computing cloud service system 100 includes a client 102 and a server 104. The client 102 is communicatively coupled to the server 104 via a communication network 150.

In some embodiments, the communication network 150 may include the Internet, one or more local area networks, wide area networks, cellular networks, mobile networks, other types of networks, or a combination of these networks.

The client 102 is a terminal of a user who wants to use a quantum computing cloud service. The client 102 may connect to the server 104 and transmit a request to perform quantum computing to the server 104. Various communication devices such as a desktop PC, a laptop computer, a tablet PC, and a mobile phone may be used as the client 102.

The server 104 is a computing device for providing a cloud service for the request to perform quantum computing of the client (102). Specifically, the server 104 may provide a standard resource description for the request to perform quantum computing and may receive resource-related information from the client 102. In addition, the server 104 may provide a standard API and receive a standard quantum computing code from the client 102. The server 104 may interpret the standard quantum computing code, select quantum computing hardware having an optimal performance environment based on the resource-related information, and cause the quantum computing code to be executed on the selected hardware.

Figure 2:
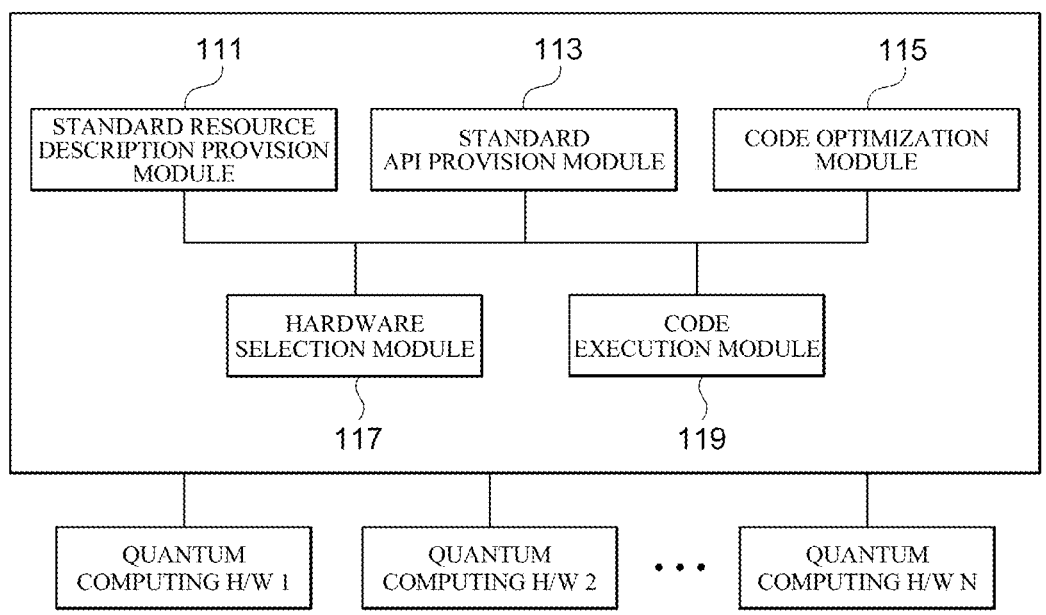
FIG. 2 is a block diagram illustrating a configuration of a server according to an embodiment of the present invention.

FIG. 2 is a block diagram illustrating a configuration of the server 104 according to an embodiment. Referring to FIG. 2, the server 104 may include a standard resource description provision module 111, a standard application program interface (API) provision module 113, a code optimization module 115, and a hardware selection module 117, and a code execution module 119. In one embodiment, the standard resource description provision module 111, the standard API provision module 113, the code optimization module 115, the hardware selection module 117, and the code execution module 119 may be implemented using one or more physically separated devices, or may be implemented by one or more processors or a combination of one or more processors and software.

The standard resource description provision module 111 may provide a standard resource description to the client 102. In the disclosed embodiments, the standard resource description is information related to resource elements (items) required for performing quantum computing, a resource scale for each resource element, and the like, and refers to standardized information so as not to be dependent on specific quantum computing hardware. The standard resource description provision module 111 may provide the standard resource description to the client 102 in order to check resource-related information such as the resource elements required by the client 102, the resource scale for each resource element, and the like. Then, the client 102 may input resource-related information corresponding to the standard resource description and transmit the resource-related information to the server 104.

Here, the resource elements required to perform quantum computing according to the request to perform quantum computing may include the number of qubits, qubit lifetime, gate fidelity, and gate operation time, qubit connectivity, and the like.

The qubit is a basic information unit in quantum computing, and may represent 0 and 1 values simultaneously, unlike a bit represented by only 0 or 1 in classical computing. The number of qubits refers to the number of qubits (information representation amount) that may be processed by quantum computing hardware. The qubit lifetime refers to the duration of information of physical qubits provided by quantum computing hardware. The gate fidelity refers to reliability (operation accuracy) for performance of gates, which are qubit operators provided by quantum computing hardware.

The gate operation time may refer to the time (time required for operation) required to process information of the qubits provided by the quantum computing hardware. The qubit connectivity indicates connectivity between qubits provided by quantum computing hardware, and may refer to a degree of connection indicating whether a connection relationship between several qubits is full or partial.

For example, the client 102 may input resource-related information, such as Number of Qubits: 20 or more, Qubit Lifetime: 80 μs or more, and Gate Fidelity: 99% or more, and transmit the resource-related information to the server 104. Here, the number of qubits of 20 or more, the qubit lifetime of 80 μs or more, and the gate fidelity of 99% or more, etc., may correspond to a resource scale for each resource item.

The standard API provision module 113 may provide the standard application program interface (API) to the client 102. Here, the standard API may be an API for creating standard quantum computing code that is commonly applied regardless of quantum computing hardware. That is, the standard API may be a device agnostic API. The standard API may include preset libraries for creating the standard quantum computing code. The standard API provision module 113 may receive the standard quantum computing code created through the standard API from the client 102.

The code optimization module 115 may interpret the standard quantum computing code created through a standard API. The code optimization module 115 may reconstruct the standard quantum computing code by optimizing the standard quantum computing code based on the code interpretation.

In an exemplary embodiment, the code optimization module 115 may check whether or not the maximum number of qubits according to the standard quantum computing code exceeds the preset threshold number of qubits. That is, the code optimization module 115 may check whether or not the maximum number of qubits (information representation amount) according to the standard quantum computing code exceeds the preset threshold number of qubits that may be processed by the quantum computing hardware for performing the cloud service. In line with the technological development of quantum computing hardware, the threshold number of qubits may be updated frequently or periodically. When the maximum number of qubits according to the standard quantum computing code exceeds the preset threshold number of qubits, the code optimization module 115 may optimize the standard quantum computing code such that the maximum number of qubits according to the standard quantum computing code is equal to or less than the preset threshold number of qubits.

In addition, the code optimization module 115 may check whether or not the number of quantum gates (logical operators for the states of qubits) that are simultaneously operated in the standard quantum computing code exceeds the preset threshold number of operators. In quantum computing, since there is a qubit lifetime (that is, duration of information), there is a possibility that an error increases if many operations are performed on the qubits at a time. Accordingly, when the number of quantum gates simultaneously operated in the standard quantum computing code exceeds the preset threshold number of operators, the code optimization module 115 may optimize the standard quantum computing code such that the number of quantum gates simultaneously operated in the standard quantum computing code is equal to or less than the preset threshold number of operators.

In addition, the code optimization module 115 may optimize and reconstruct the standard quantum computing code in order to shorten the execution time of the standard quantum computing code, remove the unnecessary or redundant operation in the standard quantum computing code, or reduce the resources used in the standard quantum computing code.

On the other hand, optimization of standard quantum computing code may be executed in the same as or similar to the optimization of computing code in classical computing. The method of optimizing the standard quantum computing code itself falls outside the scope of the present invention, and thus a detailed description thereof will be omitted.

The hardware selection module 117 may select quantum computing hardware, which is to execute the corresponding standard quantum computing code, among a plurality of quantum computing hardware, based on resource-related information and standard quantum computing code.

Specifically, the hardware selection module 117 may assign a matching score to each of the plurality of quantum computing hardware according to similarity with resource-related information. In an exemplary embodiment, the hardware selection module 117 may assign a matching score to each of the plurality of quantum computing hardware according to the degree of similarity with the specification of each of the plurality of quantum computing hardware for each item of resource-related information such as the number of qubits, the qubit lifetime, the gate fidelity, the gate operation time, and the qubit connectivity.

The hardware selection module 117 may select, as quantum computing hardware which is to execute the corresponding standard quantum computing code, quantum computing hardware with the highest total matching score for each resource item of resource-related information among the plurality of quantum computing hardware.

The code execution module 119 may execute the standard quantum computing code using the selected quantum computing hardware. The code execution module 119 may convert the standard quantum computing code into quantum computing code executable on the selected quantum computing hardware. That is, the code execution module 119 may convert standard quantum computing code into quantum computing code created using an application program interface (API) for the selected quantum computing hardware. To this end, the code execution module 119 may store the API of each of the plurality of quantum computing hardware providing a cloud service and the standard API by matching the API and the standard API.

The code execution module 119 may transfer the converted quantum computing code to the selected quantum computing hardware and execute the transferred quantum computing code. Meanwhile, the server 104 may transfer the result of executing the converted quantum computing code on the computing hardware to the client 102 through the standard API.

According to the disclosed embodiment, a standard resource description and an standard API are provided to the client 102, resource-related information and standard quantum computing code are received from the client 102, quantum computing hardware executable in an optimal environment is selected, and the standard quantum computing code is converted into quantum computing code executable on the quantum computing hardware and executed, thereby allowing a user to easily utilize a quantum computing environment including various quantum computing hardware and APIs. As a result, it is possible to meet a paradigm shift from classical computing to quantum computing, and to improve accessibility and marketability of quantum computing.

Meanwhile, in one embodiment, the client 102 and the server 104 may be implemented on a computing device that includes one or more processors and a computer-readable recording medium connected to the one or more processors. The computer-readable recording medium may be inside or outside the processor, and may be connected to the processor by using various well-known means. The processor in the computing device may cause each computing device to perform steps according to the exemplary embodiment described in this specification. For example, the processor may execute an instruction stored on the computer-readable recording medium, and the instruction stored on the computer-readable recording medium may be configured to, when executed by the processor, cause the computing device to perform steps according to the exemplary embodiment described in this specification.

In addition, in this specification, a module may refer to a functional and structural combination of hardware for performing the technical idea of the present invention and software for driving the hardware. For example, the "module" may refer to a logical unit of a predetermined code and a hardware resource on which the predetermined code is executed, and does not necessarily refer to a physically connected code or a single type of hardware.

Figure 3:
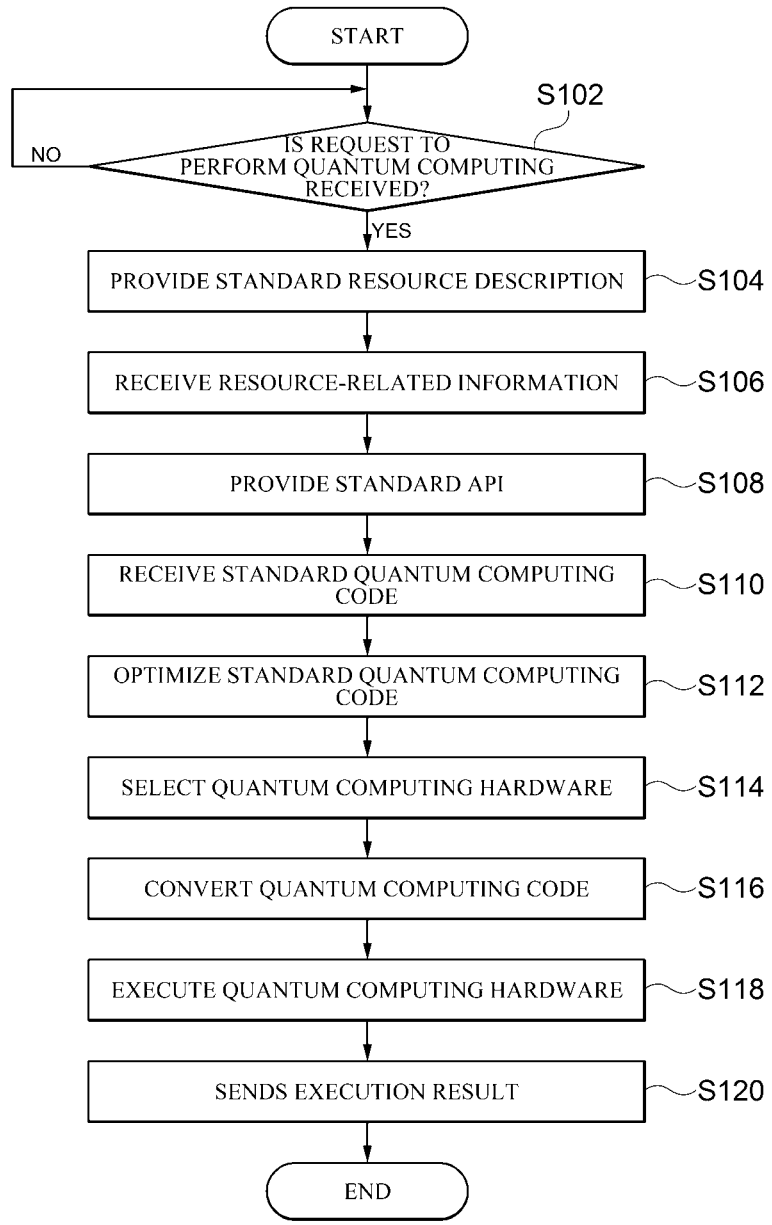
FIG. 3 is a flowchart illustrating a method for serving cloud of quantum computing according to an embodiment of the present invention.

FIG. 3 is a flowchart illustrating a method for serving cloud of quantum computing according to an embodiment of the present invention. In the illustrated flowchart, the method is described as being divided into a plurality of steps, but at least some of the steps may be performed by changing the order, may be performed in combination with other steps, may be omitted, may be performed by being divided into detailed steps, or may be performed by adding one or more steps (not illustrated) thereto.

Referring to FIG. 3, the server 104 checks whether or not a request to perform quantum computing is received from the client 102 (S 102), provides a standard resource description to the client 102 when the request to perform quantum computing is received (S 104), and receives resource-related information corresponding to the standard resource description from the client 102 (S 106).

Next, the server 104 provides the standard API to the client 102 (S 108), and receives standard quantum computing code created through the standard API from the client 102 (S 110).

Next, the server 104 interprets the standard quantum computing code and optimizes the standard quantum computing code (S 112). The server 104 may optimize and reconstruct the standard quantum computing code according to a preset optimization criterion.

Next, the server 104 selects quantum computing hardware, which is to execute the corresponding standard quantum computing code, among a plurality of quantum computing hardware, based on the resource-related information and the standard quantum computing code (S 114).

Next, the server 104 converts the standard quantum computing code into quantum computing code executable on the selected quantum computing hardware (S 116), and transfers the converted quantum computing code to the selected quantum computing hardware to be executed thereon (S 118). The server 104 transfers the result of executing the converted quantum computing code on the computing hardware to the client 102 through the standard API (S 120).

Figure 4:
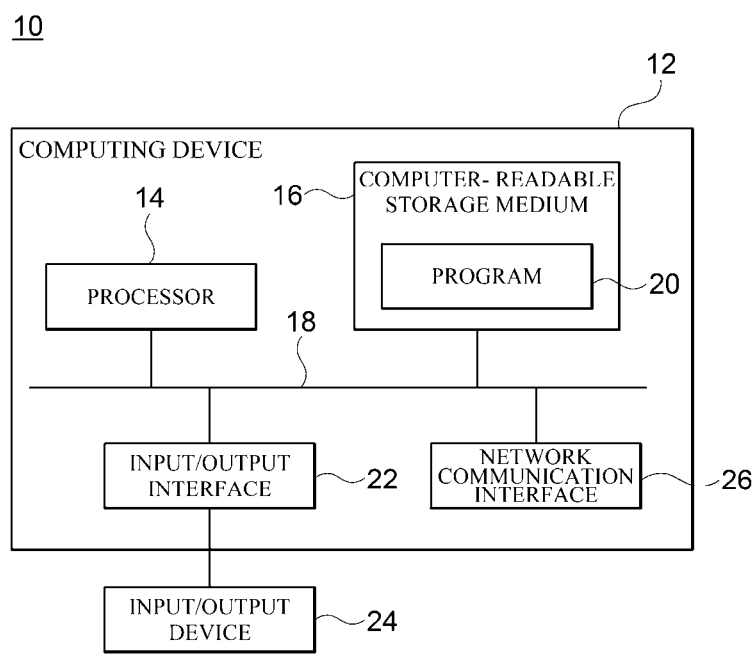
FIG. 4 is a block diagram for describing an example of a computing environment including a computing device suitable for use in exemplary embodiments.

FIG. 4 is a block diagram exemplarily illustrating a computing environment 10 that includes a computing device suitable for use in the exemplary embodiment. In the illustrated embodiment, each component may have different functions and capabilities in addition to those described below, and additional components may be included in addition to those described below.

The illustrated computing environment 10 includes a computing device 12. In one embodiment, the computing device 12 may be the client 102. Further, the computing device 12 may be the server 104.

The computing device 12 includes at least one processor 14, a computer-readable storage medium 16, and a communication bus 18. The processor 14 may cause the computing device 12 to perform steps according to the exemplary embodiment described above. For example, the processor 14 may execute one or more programs stored in the computer-readable storage medium 16. The one or more programs may include one or more computer-executable instructions, which, when executed by the processor 14, may be configured to cause the computing device 12 to perform steps according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory (e.g., random access memory), non-volatile memory, or any suitable combination thereof), one or more magnetic disk storage devices, optical disk storage devices, flash memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the exemplary embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A method for serving cloud of quantum computing that is performed in a computing device including one or more processors and a memory storing one or more programs executed by the one or more processors, the method comprising: receiving a request to perform quantum computing from a client, and providing a standard resource description to the client; receiving, from the client, resource-related information corresponding to the standard resource description; providing a standard application program interface (API) to the client, and receiving, from the client, standard quantum computing code created through the standard API; selecting quantum computing hardware, which is to execute the standard quantum computing code, among a plurality of quantum computing hardware, based on one or more among the resource-related information and the standard quantum computing code; converting the standard quantum computing code into quantum computing code executable on the selected quantum computing hardware; and executing the converted quantum computing code using the selected quantum computing hardware;

wherein the resource-related information includes resource items required for quantum computing and a resource scale for each resource item; and the resource items include one or more among number of qubits, qubit lifetime, gate fidelity, gate operation time, and qubit connectivity.

2. The method of claim 1, further comprising: interpreting the standard quantum computing code and reconstructing the standard quantum computing code according to a result of the code interpretation.

3. The method of claim 2, wherein the reconstructing of the standard quantum computing code includes: checking whether or not a maximum number of qubits according to the standard quantum computing code exceeds preset threshold number of qubits; and reconstructing the standard quantum computing code in order that the maximum number of qubits according to the standard quantum computing code is equal to or less than the preset threshold number of qubits when the maximum number of qubits exceeds the preset threshold number of qubits.

4. The method of claim 2, wherein the reconstructing of the standard quantum computing code includes: checking whether or not a number of quantum gates simultaneously operated in the standard quantum computing code exceeds preset threshold number of operators; and reconstructing the standard quantum computing code in order that the number of quantum gates simultaneously operated in the standard quantum computing code is equal to or less than the preset threshold number of operators when the number of the quantum gates exceeds the preset threshold number of operators.

5. The method of claim 2, wherein the reconstructing of the standard quantum computing code includes one or more among shortening execution time of the standard quantum computing code, removing unnecessary or redundant operations included in the standard quantum computing code, and reducing resources used for execution of the standard quantum computing code.

6. The method of claim 1, wherein the resource-related information includes resource items required for quantum computing and a resource scale for each resource item; and the selecting of the quantum computing hardware comprises: assigning a matching score according to a degree of similarity between the resource scale of each resource item of the resource-related information and a specification of each of the plurality of quantum computing hardware; and selecting, as quantum computing hardware which is to execute the corresponding standard quantum computing code, the quantum computing hardware with a highest total matching score for each resource item among the plurality of quantum computing hardware.

7. The method of claim 1, wherein the converting of the quantum computing code converts the standard quantum computing code into a quantum computing code by an application program interface (API) of the selected quantum computing hardware.

8. The method of claim 7, further comprising, after executing the converted quantum computing code using the selected quantum computing hardware, transferring a result of executing the converted quantum computing code using the selected quantum computing hardware to the client through the standard API.

9. A computing device configured to include one or more processors, a memory, and one or more programs stored in the memory and executed by the one or more processors, the computing device comprising: a standard resource description provision module that receives a request to perform quantum computing from a client, provides a standard resource description to the client, and receives, from the client, resource-related information corresponding to the standard resource description; a standard API provision module that provides a standard application program interface (API) to the client and receives, from the client, standard quantum computing code created through the standard API; a hardware selection module that selects quantum computing hardware, which is to execute the standard quantum computing code, among a plurality of quantum computing hardware, based on one or more among the resource-related information and the standard quantum computing code; and a code execution module that converts the standard quantum computing code into quantum computing code executable on the selected quantum computing hardware, and executes the converted quantum computing code using the selected quantum computing hardware;

wherein the resource-related information includes resource items required for quantum computing and a resource scale for each resource item; and the resource items include one of more among number of qubits, qubit lifetime, gate fidelity, gate operation time, and qubit connectivity.

10. The computing device of claim 9, further comprising: a code optimization module that interprets the standard quantum computing code and reconstructs the standard quantum computing code according to a result of the code interpretation.

11. The computing device of claim 10, wherein the code optimization module checks whether or not a maximum number of qubits according to the standard quantum computing code exceeds preset number of threshold qubits and reconstruct the standard quantum computing code in order that the maximum number of Obits according to the standard quantum computing code is equal to or less than the preset threshold number of qubits when the maximum number of qubits exceeds the preset threshold number of qubits.

12. The computing device of claim 10, wherein the code optimization module checks whether or not a number of quantum gates simultaneously operated in the standard quantum computing code exceeds preset threshold number of operators and reconstruct the standard quantum computing code in order that the number of quantum gates simultaneously operated in the standard quantum computing code is equal to or less than the preset threshold number of operators, when the number of the quantum gates exceeds the preset threshold number of operators.

13. The computing device of claim 10, wherein the code optimization module performs one or more among shortening execution time of the standard quantum computing code, removing unnecessary or redundant operations included in the standard quantum computing code, and reducing resources used for execution of the standard quantum computing code.

14. The computing device of claim 9, wherein the resource-related information includes resource items required for quantum computing and a resource scale for each resource item; and the hardware selection module assigns a matching score according to a degree of similarity between the resource scale of each resource item of the resource-related information and a specification of each of the plurality of quantum computing hardware, and selects, as quantum computing hardware which is to execute the corresponding standard quantum computing code, the quantum computing hardware with a highest total matching score for each resource item among the plurality of quantum computing hardware.

15. The computing device of claim 9, wherein the code execution module converts the standard quantum computing code into a quantum computing code by an application program interface (API) of the selected quantum computing hardware.

16. The computing device of claim 15, wherein the code execution module transfers a result of executing the converted quantum computing code using the selected quantum computing hardware to the client through the standard API.

* * * * *